United States Patent
Ku et al.

(10) Patent No.: US 7,228,873 B2
(45) Date of Patent: Jun. 12, 2007

(54) VALVE DESIGN AND CONFIGURATION FOR FAST DELIVERY SYSTEM

(75) Inventors: Vincent W. Ku, San Jose, CA (US); Ling Chen, Sunnyvale, CA (US); Dien-Yeh Wu, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 11/432,063

(22) Filed: May 11, 2006

(65) Prior Publication Data

US 2006/0213557 A1    Sep. 28, 2006

Related U.S. Application Data

(63) Continuation of application No. 10/199,482, filed on Jul. 19, 2002, now Pat. No. 7,066,194.

(51) Int. Cl.
*F16K 31/28* (2006.01)
*F16K 31/02* (2006.01)

(52) U.S. Cl. ............... 137/624.11; 137/341; 137/897; 251/129.17; 118/719; 118/720

(58) Field of Classification Search .......... 137/240, 137/341, 606, 897, 624.11; 118/719, 720; 251/129.17

See application file for complete search history.

(56) References Cited

U.S. PATENT DOCUMENTS 3,173,814 A   3/1965  Law
3,592,440 A   7/1971  McFarland et al.
3,721,583 A   3/1973  Blakeslee
3,930,908 A   1/1976  Jolly (Continued)

FOREIGN PATENT DOCUMENTS

EP    1 167 569    1/2002

(Continued)

OTHER PUBLICATIONS

Clark/Phelps, et al. "Engineered Tantalum Aluminate and Hafnium Aluminate ALD Films for Ultrathin Dielectric Films with Improved Electrical and Thermal Properties," Mat. Res. Soc. Symp. Proc. vol. 670 (2001), pp. K2.2.1.

(Continued)

*Primary Examiner*—A. Michael Chambers
(74) *Attorney, Agent, or Firm*—Patterson & Sheridan, LLP

(57) ABSTRACT

Embodiments of the invention relate to a substrate processing chamber. In one embodiment a substrate processing chamber includes a chamber body containing a substrate support, a lid assembly comprising an expanding channel extending from a central portion of the lid assembly to a peripheral portion of the lid assembly and positioned to substantially cover the substrate support, and one or more valves adapted to provide one or more reactants into the chamber body. The valves comprising a valve body having at least two ports comprising a purge inlet and an outlet, a valve seat surrounding one of the ports, an annular groove formed around the valve seat coupling the purge inlet and the outlet, and a diaphragm assembly. The diaphragm assembly comprises a diaphragm movable to contact the valve seat, a piston coupled to the diaphragm, and a cylinder to house the piston.

45 Claims, 8 Drawing Sheets

U.S. PATENT DOCUMENTS

| | | |
|---|---|---|
| 4,058,430 A | 11/1977 | Suntola et al. |
| 4,389,973 A | 6/1983 | Suntola et al. |
| 4,413,022 A | 11/1983 | Suntola et al. |
| 4,741,354 A | 5/1988 | DeMild, Jr. |
| 4,834,831 A | 5/1989 | Nishizawa et al. |
| 4,993,357 A | 2/1991 | Scholz |
| 5,225,366 A | 7/1993 | Yoder |
| 5,281,274 A | 1/1994 | Yoder |
| 5,294,286 A | 3/1994 | Nishizawa et al. |
| 5,374,570 A | 12/1994 | Nasu et al. |
| 5,413,139 A | 5/1995 | Kusumoto et al. |
| 5,441,703 A | 8/1995 | Jurgensen |
| 5,443,647 A | 8/1995 | Aucoin et al. |
| 5,480,818 A | 1/1996 | Matsumoto et al. |
| 5,483,919 A | 1/1996 | Yokoyama et al. |
| 5,503,875 A | 4/1996 | Imai et al. |
| 5,674,786 A | 10/1997 | Turner et al. |
| 5,711,811 A | 1/1998 | Suntola et al. |
| 5,755,428 A | 5/1998 | Olliver |
| 5,796,116 A | 8/1998 | Nakata et al. |
| 5,807,792 A | 9/1998 | Ilg et al. |
| 5,820,105 A | 10/1998 | Yamaji et al. |
| 5,835,677 A | 11/1998 | Li et al. |
| 5,855,680 A | 1/1999 | Soininen et al. |
| 5,879,459 A | 3/1999 | Gadgil et al. |
| 5,916,365 A | 6/1999 | Sherman |
| 5,923,056 A | 7/1999 | Lee et al. |
| 6,015,590 A | 1/2000 | Suntola et al. |
| 6,015,917 A | 1/2000 | Bhandari et al. |
| 6,035,609 A | 3/2000 | Evans et al. |
| 6,042,652 A | 3/2000 | Hyun et al. |
| 6,084,302 A | 7/2000 | Sandhu |
| 6,123,097 A | 9/2000 | Truong et al. |
| 6,124,158 A | 9/2000 | Dautartas et al. |
| 6,139,700 A | 10/2000 | Kang et al. |
| 6,144,060 A | 11/2000 | Park et al. |
| 6,174,377 B1 | 1/2001 | Doering et al. |
| 6,174,809 B1 | 1/2001 | Kang et al. |
| 6,176,438 B1 | 1/2001 | Sato et al. |
| 6,183,563 B1 | 2/2001 | Choi et al. |
| 6,197,683 B1 | 3/2001 | Kang et al. |
| 6,200,893 B1 | 3/2001 | Sneh |
| 6,207,487 B1 | 3/2001 | Kim et al. |
| 6,231,672 B1 | 5/2001 | Choi et al. |
| 6,270,572 B1 | 8/2001 | Kim et al. |
| 6,284,646 B1 | 9/2001 | Leem |
| 6,287,965 B1 | 9/2001 | Kang et al. |
| 6,305,314 B1 | 10/2001 | Sneh et al. |
| 6,306,216 B1 | 10/2001 | Kim et al. |
| 6,321,780 B1 | 11/2001 | Iwabuchi |
| 6,342,277 B1 | 1/2002 | Sherman |
| 6,348,376 B2 | 2/2002 | Lim et al. |
| 6,358,829 B2 | 3/2002 | Yoon et al. |
| 6,372,598 B2 | 4/2002 | Kang et al. |
| 6,379,748 B1 | 4/2002 | Bhandari et al. |
| 6,391,785 B1 | 5/2002 | Satta et al. |
| 6,399,491 B2 | 6/2002 | Jeon et al. |
| 6,416,577 B1 | 7/2002 | Suntola et al. |
| 6,416,822 B1 | 7/2002 | Chiang et al. |
| 6,428,859 B1 | 8/2002 | Chiang et al. |
| 6,447,607 B2 | 9/2002 | Soininen et al. |
| 6,451,119 B2 | 9/2002 | Sneh et al. |
| 6,451,695 B2 | 9/2002 | Sneh |
| 6,468,924 B2 | 10/2002 | Lee et al. |
| 6,475,276 B1 | 11/2002 | Elers et al. |
| 6,475,910 B1 | 11/2002 | Sneh |
| 6,478,872 B1 | 11/2002 | Chae et al. |
| 6,481,945 B1 | 11/2002 | Hasper et al. |
| 6,482,262 B1 | 11/2002 | Elers et al. |
| 6,482,733 B2 | 11/2002 | Raaijmakers |
| 6,511,539 B1 | 1/2003 | Raaijmakers |
| 6,551,406 B2 | 4/2003 | Kilpi |
| 2001/0000866 A1 | 5/2001 | Sneh et al. |
| 2001/0002280 A1 | 5/2001 | Sneh |
| 2001/0009140 A1 | 7/2001 | Bondestam et al. |
| 2001/0009695 A1 | 7/2001 | Saanila et al. |
| 2001/0011526 A1 | 8/2001 | Doering et al. |
| 2001/0013312 A1 | 8/2001 | Soininen et al. |
| 2001/0014371 A1 | 8/2001 | Kilpi |
| 2001/0024387 A1 | 9/2001 | Raaijmakers et al. |
| 2001/0025979 A1 | 10/2001 | Kim et al. |
| 2001/0028924 A1 | 10/2001 | Sherman |
| 2001/0034123 A1 | 10/2001 | Jeon et al. |
| 2001/0041250 A1 | 11/2001 | Werkhoven et al. |
| 2001/0042523 A1 | 11/2001 | Kesala |
| 2001/0042799 A1 | 11/2001 | Kim et al. |
| 2001/0047826 A1 | 12/2001 | Ishigaki |
| 2001/0054377 A1 | 12/2001 | Lindfors et al. |
| 2001/0054730 A1 | 12/2001 | Kim et al. |
| 2001/0054769 A1 | 12/2001 | Raaijmakers et al. |
| 2002/0000196 A1 | 1/2002 | Park |
| 2002/0000598 A1 | 1/2002 | Kang et al. |
| 2002/0007790 A1 | 1/2002 | Park |
| 2002/0020869 A1 | 2/2002 | Park et al. |
| 2002/0021544 A1 | 2/2002 | Cho et al. |
| 2002/0031618 A1 | 3/2002 | Sherman |
| 2002/0041931 A1 | 4/2002 | Suntola et al. |
| 2002/0048635 A1 | 4/2002 | Kim et al. |
| 2002/0052097 A1 | 5/2002 | Park |
| 2002/0066411 A1 | 6/2002 | Chiang et al. |
| 2002/0068458 A1 | 6/2002 | Chiang et al. |
| 2002/0073924 A1 | 6/2002 | Chiang et al. |
| 2002/0076481 A1 | 6/2002 | Chiang et al. |
| 2002/0076507 A1 | 6/2002 | Chiang et al. |
| 2002/0076508 A1 | 6/2002 | Chiang et al. |
| 2002/0076837 A1 | 6/2002 | Hujanen et al. |
| 2002/0082296 A1 | 6/2002 | Verschoor et al. |
| 2002/0086106 A1 | 7/2002 | Park et al. |
| 2002/0092471 A1 | 7/2002 | Kang et al. |
| 2002/0094689 A1 | 7/2002 | Park |
| 2002/0098627 A1 | 7/2002 | Pomarede et al. |
| 2002/0104481 A1 | 8/2002 | Chiang et al. |
| 2002/0106536 A1 | 8/2002 | Lee et al. |
| 2002/0108570 A1 | 8/2002 | Lindfors |
| 2002/0134307 A1 | 9/2002 | Choi |
| 2002/0144655 A1 | 10/2002 | Chiang et al. |
| 2002/0144657 A1 | 10/2002 | Chiang et al. |
| 2002/0146511 A1 | 10/2002 | Chiang et al. |
| 2002/0155722 A1 | 10/2002 | Satta et al. |
| 2002/0162506 A1 | 11/2002 | Sneh et al. |
| 2002/0164421 A1 | 11/2002 | Chiang et al. |
| 2002/0164423 A1 | 11/2002 | Chiang et al. |
| 2002/0177282 A1 | 11/2002 | Song |
| 2002/0182320 A1 | 12/2002 | Leskela et al. |
| 2002/0187256 A1 | 12/2002 | Elers et al. |
| 2002/0197402 A1 | 12/2002 | Chiang et al. |
| 2003/0004723 A1 | 1/2003 | Chihara |
| 2003/0013320 A1 | 1/2003 | Kim et al. |
| 2003/0031807 A1 | 2/2003 | Elers et al. |
| 2003/0042630 A1 | 3/2003 | Babcoke et al. |
| 2003/0049942 A1 | 3/2003 | Haukka et al. |
| 2003/0072975 A1 | 4/2003 | Shero et al. |
| 2003/0075273 A1 | 4/2003 | Kipela et al. |
| 2003/0075925 A1 | 4/2003 | Lindfors et al. |
| 2004/0011404 A1 | 1/2004 | Ku et al. |

FOREIGN PATENT DOCUMENTS

| | | |
|---|---|---|
| GB | 2 355 727 | 5/2001 |
| JP | 5898917 | 6/1983 |
| JP | 4291916 | 10/1992 |
| JP | 5047666 | 6/1993 |
| JP | 5206036 | 8/1993 |
| JP | 5234899 | 9/1993 |

| | | |
|---|---|---|
| JP | 5270997 | 10/1993 |
| JP | 6224138 | 8/1994 |
| JP | 2000319772 | 11/2000 |
| JP | 2001020075 | 1/2001 |
| JP | 2001111000 | 4/2001 |
| JP | 2001172767 | 6/2001 |
| WO | WO 96/17107 | 6/1996 |
| WO | WO 99/01595 | 1/1999 |
| WO | WO 99/29924 | 6/1999 |
| WO | WO 99/65064 | 12/1999 |
| WO | WO 0016377 | 3/2000 |
| WO | WO 00/54320 | 9/2000 |
| WO | WO 00/79576 | 12/2000 |
| WO | WO 01/15220 | 3/2001 |
| WO | WO 01/17692 | 3/2001 |
| WO | WO 01/27346 | 4/2001 |
| WO | WO 01/27347 | 4/2001 |
| WO | WO 01/29280 | 4/2001 |
| WO | WO 01/29891 | 4/2001 |
| WO | WO 01/29893 | 4/2001 |
| WO | WO 01/36702 | 5/2001 |
| WO | WO 01/66832 | 9/2001 |
| WO | WO 02/08485 | 1/2002 |
| WO | WO 02/08488 | 1/2002 |
| WO | WO 02/43115 | 5/2002 |
| WO | WO 02/45167 | 6/2002 |

OTHER PUBLICATIONS

Eisenbraun, et al. "Atomic Layer Deposition (ALD) of Tantalum-based materials for zero thickness cooper barrier applications," Proceedings of the IEEE 2001 International Interconnect Technology Conference (Cat. No. 01EX461) 2001, pp. 207-209.

Kukli, et al. "Atomic Layer Epitaxy Growth of Tantalum Oxide Thin Films from $Ta(OC_2H_5)_5$ and $H_2O$," Journal of the Electrochemical Society, vol. 142, May 1995; pp. 1670-1675.

Kukli, et al. "In situ Study of Atomic Layer Epitaxy Growth of Tantalum Oxide Thin Films From $Ta(OC_2H_5)_5$ and $H_2O$," Applied Surface Science, vol. 112, Mar. 1997, pp. 236-242.

Kukli, et al. "Properties of $\{Nb_{1/x}Ta_x\}_2O_5$ Solid Solutions and $\{Nb_{1/x}Ta_x 2O_5$ -$ZrO_2$ Nanolaminates Grown by Atomic Layer Epitaxy," 1997; pp. 785-793.

Kukli, et al. "Properties of $Ta_2O_5$/ Based Dielectric Nanolaminates Deposited by Atomic Layer Epitaxy," Journal of the Electrochemical Society, vol. 144, No. 1, Jan. 1997; p. 300-306.

Kukli, et al. "Properties of $Ta_2O_5$/ Based Dielectric Nanolaminates Deposited by Atomic Layer Epitaxy," Journal of the Electrochemical Society, vol. 144, No. 1, Jan. 1997; p. 300-306.

Kukli, et al. "Tailoring the Dielectric Properties of $HfO_2$-$Ta_2O_5$ Nanolaminates," Applied Physics Letters, vol. 68, No. 26, Jun. 24, 1996; pp. 3737-3739.

Niinisto, et al. "Synthesis of Oxide Thin Films and Overlayers by Atomic Layer Epitaxy for Advanced Applications," Materials Science and Engineering B41 (1996) pp. 23-29.

Ritala, et al. "Perfectly Conformal TiN and $Al_2O_3$ Films Deposited by Atomic Layer Deposition," Chemical Vapor Deposition, Jan. 5, 1999, No. 1, pp. 6-9.

Rossnagel, et al. "Plasma/enhanced Atomic Layer Deposition of Ta and Ti for Interconnect Diffusion Barriers," J. Vac. Sci. Technol. B., vol. 18, No. 4 (Jul. 2000); pp. 2016-2020.

VALVE DESIGN AND CONFIGURATION FOR FAST DELIVERY SYSTEM

CROSS-REFERENCE TO RELATED APPLICATIONS

This application is a continuation of U.S. Ser. No. 10/199,482, filed Jul. 19, 2002 now U.S. Pat. No. 7,066,194, which is herein incorporated in its entirety by reference.

BACKGROUND OF THE INVENTION

1. Field of the Invention

Embodiments of the present invention relate to a method and apparatus for delivery of one or more reactants to a substrate processing chamber. More particularly, embodiments of the present invention relate to a valve assembly for rapid delivery of pulses of one or more reactants to a substrate processing chamber.

2. Description of the Related Art

Reliably producing sub-micron and smaller features is one of the key technologies for the next generation of very large scale integration (VLSI) and ultra large scale integration (ULSI) of semiconductor devices. However, as the fringes of circuit technology are pressed, the shrinking dimensions of interconnects in VLSI and ULSI technology have placed additional demands on the processing capabilities. The multilevel interconnects that lie at the heart of this technology require precise processing of high aspect ratio features, such as vias and other interconnects. Reliable formation of these interconnects is very important to VLSI and ULSI success and to the continued effort to increase circuit density and quality of individual substrates.

As circuit densities increase, the widths of vias, contacts, and other features, as well as the dielectric materials between them, decrease to sub-micron dimensions (e.g., less than 0.20 micrometers or less), whereas the thickness of the dielectric layers remains substantially constant, with the result that the aspect ratios for the features, i.e., their height divided by width, increase. Many traditional deposition processes have difficulty filling sub-micron structures where the aspect ratio exceeds 4:1, and particularly where the aspect ratio exceeds 10:1. Therefore, there is a great amount of ongoing effort being directed at the formation of substantially void-free and seam-free sub-micron features having high aspect ratios.

Atomic layer deposition is one deposition technique being explored for the deposition of material layers over features having high aspect ratios. One example of atomic layer deposition comprises the sequential introduction of pulses of gases. For instance, one cycle for the sequential introduction of pulses of gases may comprise a pulse of a first reactant gas, followed by a pulse of a purge gas and/or a pump evacuation, followed by a pulse of a second reactant gas, and followed by a pulse of a purge gas and/or a pump evacuation. The term "gas" as used herein is defined to include a single gas or a plurality of gases. Sequential introduction of separate pulses of the first reactant and the second reactant may result in the alternating self-limiting adsorption of monolayers of the reactants on the surface of the substrate, thus forming a thin layer of material for each cycle. The cycle may be repeated to a desired thickness of the deposited material. A pulse of a purge gas and/or a pump evacuation between the pulses of the first reactant gas and the pulses of the second reactant gas serves to reduce the likelihood of gas phase reactions of the reactants due to excess amounts of the reactants remaining in the chamber. However, various problems exist with current gas delivery apparatuses used to perform atomic layer deposition, such as slow delivery of reactants, generation of particles, and/or failure over time of components of the gas delivery apparatuses.

Therefore, there is a need for new apparatuses and methods to perform gas delivery.

SUMMARY OF THE INVENTION

Embodiments of the present invention relate to a method and apparatus for rapid delivery of pulses of one or more reactants to a substrate processing chamber. One embodiment of a valve body includes a first inlet, a second inlet, and an outlet. A valve chamber is in fluid communication with the first inlet, the second inlet, and the outlet. A valve seat is formed at least around the first inlet. The valve chamber further includes an annular groove formed around the valve seat coupling the second inlet and the outlet.

One embodiment of a pneumatic valve assembly includes a valve body having at least two ports. A valve seat surrounds one of the ports. The pneumatic valve assembly further includes a diaphragm assembly having a diaphragm movable to open and close the one port. A piston housed in a cylinder is coupled to the diaphragm to actuate the diaphragm. An actuation chamber is formed between the cylinder and the piston. In certain embodiments, the internal volume of the actuation chamber is about 3.0 cm$^3$ or less.

Another embodiment of a pneumatic valve assembly includes a valve body having at least two ports. The pneumatic valve assembly further includes a pneumatic piston coupled to move a diaphragm between an open position and a closed position. The diaphragm in the closed position closes one of the at least two ports. The pneumatic piston is adapted to move the diaphragm between the open position and the closed position in a response time of about 50 milliseconds or less.

One embodiment of substrate processing chamber includes a chamber body and one or more valves adapted to provide one or more reactants into the chamber body. Each valve includes a valve body having at least two ports, a valve seat surrounding one of the ports, and a diaphragm assembly. The diaphragm assembly includes a diaphragm movable to open and close the one port, a piston coupled to the diaphragm, and a cylinder to house the piston. The cylinder forms an actuation chamber. In certain embodiments, the internal volume of the actuation chamber is about 3.0 cm$^3$ or less. The substrate processing chamber may further include an electronically controlled valve adapted to provide pressurized gas to the actuation chamber of the valves from a pressurized gas supply.

One embodiment of a method of delivering pulses of a reactant into a substrate processing chamber includes introducing a pressurized gas to an actuation chamber of a valve assembly and releasing the pressurized gas from the actuation chamber of the valve assembly. Introducing the pressurized gas and releasing the pressurized gas provides a pulse time of about 1.0 second or less.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention relate to a valve assembly for delivery of one or more reactants to a substrate processing chamber. More particularly, embodiments of the present invention relate to a valve assembly for rapid delivery of pulses of one or more reactants to a substrate processing chamber. Reactants can be precursors, reducing agents, oxidizing agents, catalysts, and mixtures thereof.

Figure 1:
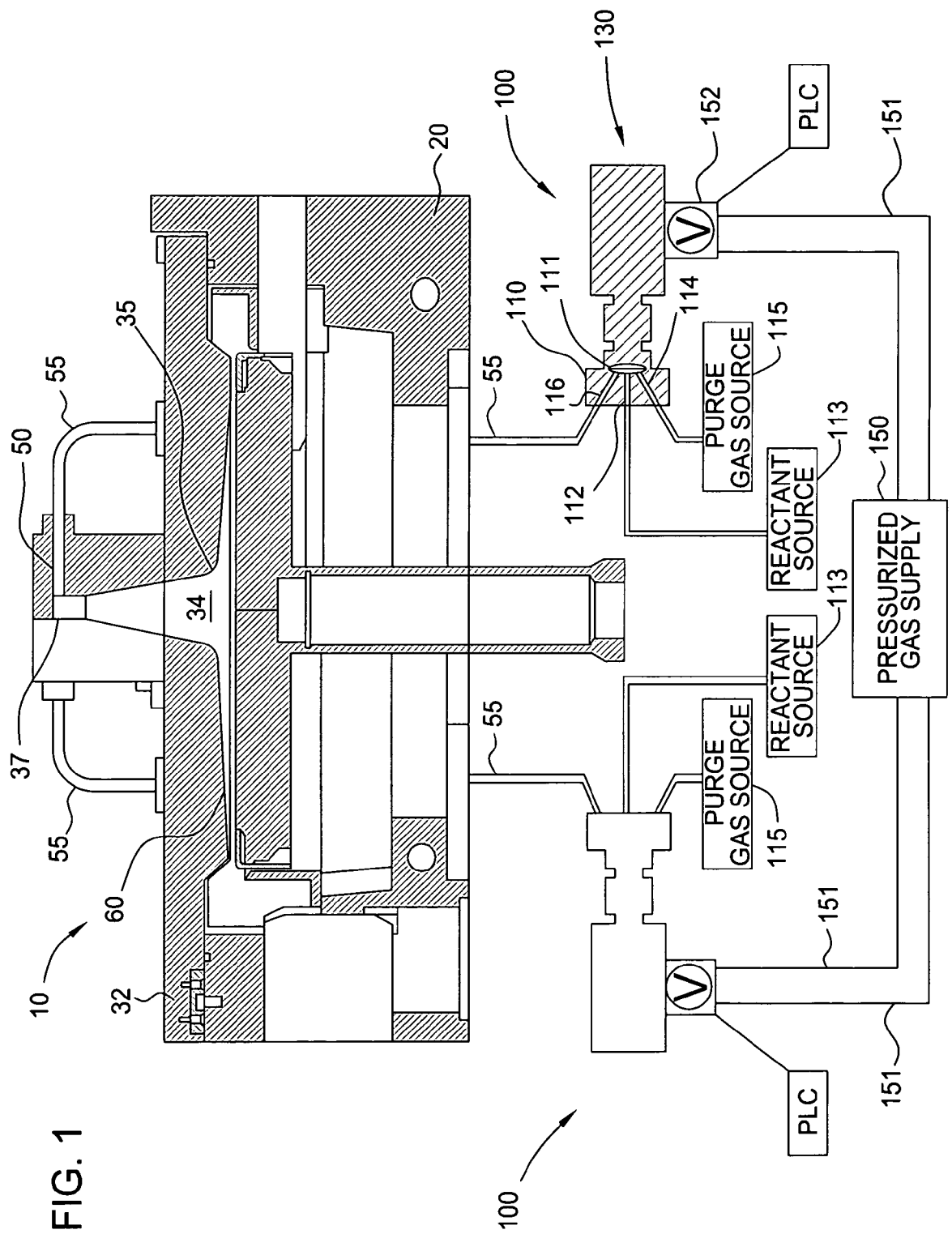
FIG. 1 is a schematic cross-sectional view of one embodiment of a substrate processing chamber including one or more valve assemblies.
Figure 8:
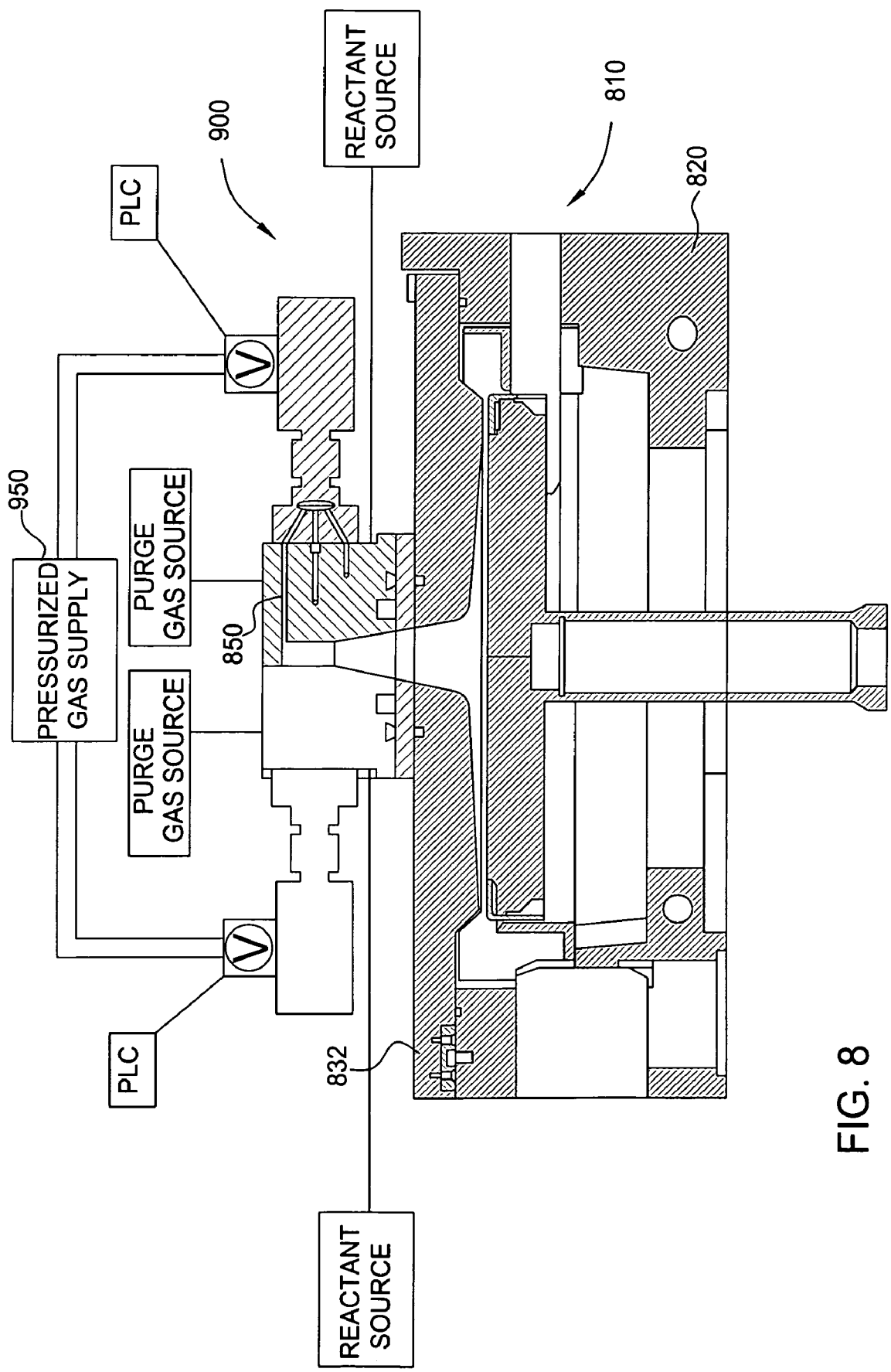
FIG. 8 is a schematic cross-sectional view of another embodiment of a substrate processing chamber including one or more valves.

FIG. 1 is a schematic cross-sectional view of one embodiment of a substrate processing chamber 10 including one or more valve assemblies 100 mounted below a chamber body 20 of the substrate processing chamber 10. The valve assemblies 100 are coupled to gas lines 55 plumbed through the chamber body 20. The gas lines 55 are, in turn, coupled to gas conduits 50 to provide one or more gases into the chamber body 20. The valve assemblies may also be mounted to other substrate processing chambers and may be mounted to other chamber components. For example, FIG. 8 is a schematic cross-sectional view of another embodiment of a substrate processing chamber 810 including one or more valve assemblies 900 mounted to a chamber lid 832 over a chamber body 820 of the substrate processing chamber 810. The valve assemblies 900 are coupled to a gas conduit 850 to provide one or more gases into the chamber body 820. The valve assembly 900 may be mounted to the chamber lid 832 to minimize the volume in flow paths between the valves assembly 100 and the reaction volume of the processing chamber.

Referring to FIG. 1, each valve assembly 100 includes a valve body 110 and a diaphragm assembly 130. The valve body 110 includes a valve chamber 111 in fluid communication with three ports—a reactant inlet 112, a purge inlet 114, and an outlet 116. The reactant inlet 112 is in fluid communication with a reactant source 113 to supply a reactant through the valve chamber 111, through the outlet 116, through the gas line 55, through the gas conduit 50, and into the chamber body 20. The purge inlet 114 is in fluid communication with a purge gas source 115 and is adapted to supply a purge gas through the valve chamber 111, through the outlet 116, through the gas line 55, through the gas conduit 50, and into the chamber body 20. If the substrate processing chamber 10 includes two or more valve assemblies 100, the purge inlet 114 of each valve assembly 100 is preferably coupled to separate purge gas sources 115. In other embodiments, the purge inlet 114 of each valve assembly 100 may be coupled to a common purge gas source.

Figure 2A:
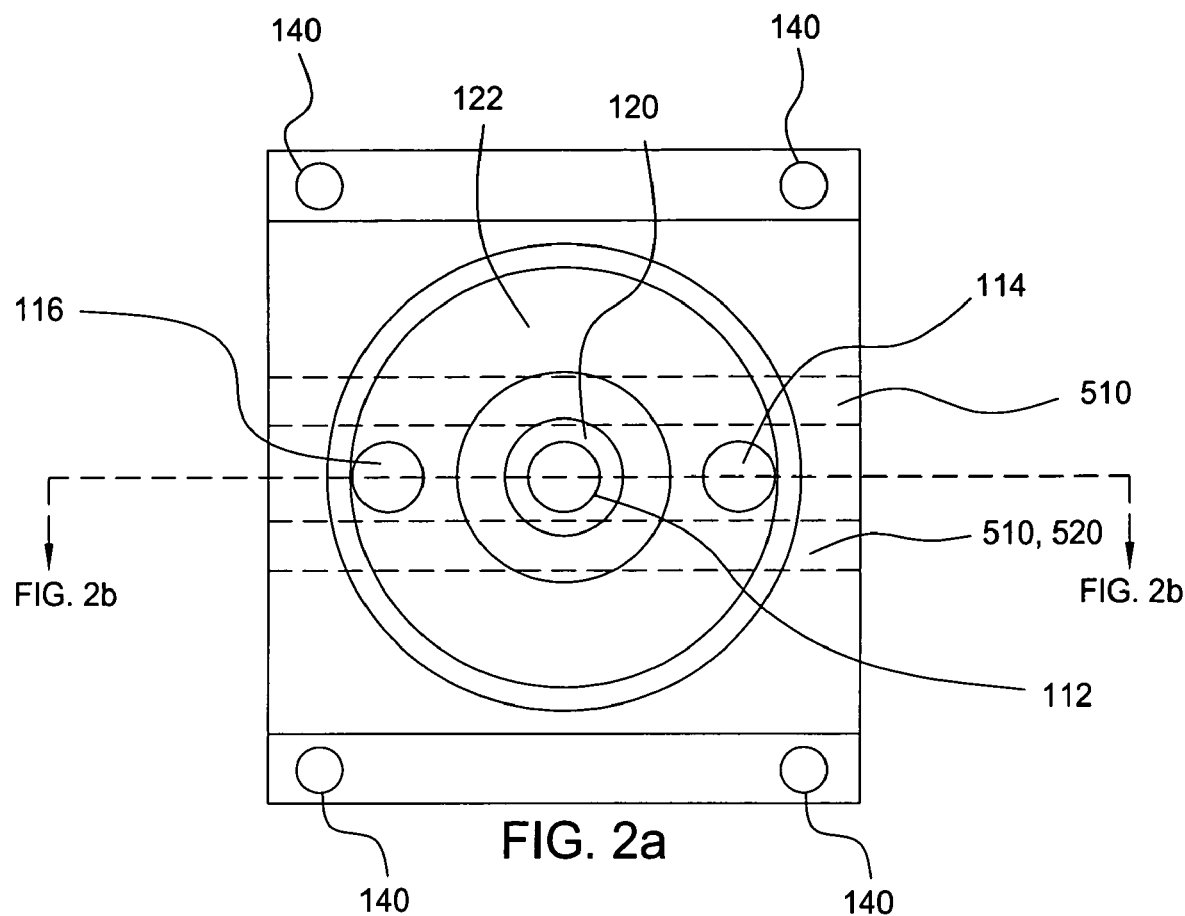
FIG. 2A is a top view of one embodiment of a valve body.
Figure 2B:
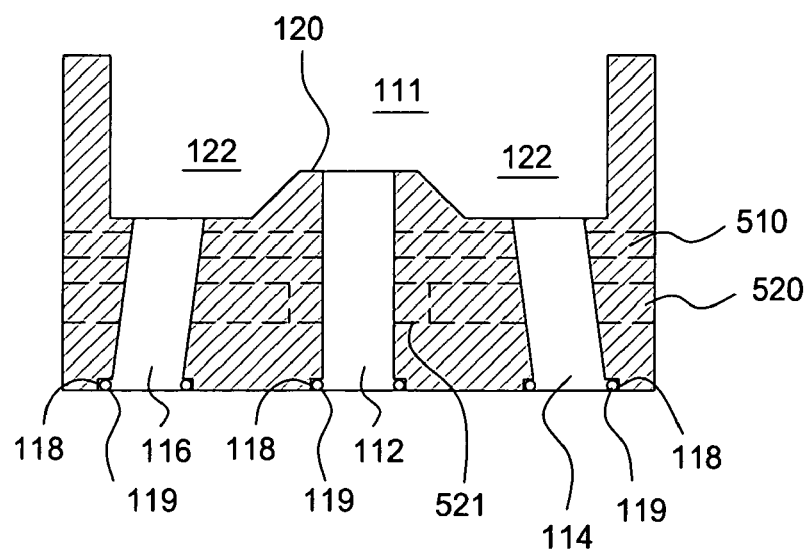
FIG. 2B is a cross-sectional view of the valve body of FIG. 2A.

FIG. 2A is a top view of the valve body 110 of FIG. 1 and FIG. 2B is a cross-sectional view of the valve body of FIG. 2A. The mouth of the reactant inlet 112 to the valve chamber 111 comprises a valve seat 120. The diaphragm assembly 130 (FIGS. 1, 3, and 4) is mounted over the valve seat 120 of the valve body 110. The diaphragm assembly 130 includes a diaphragm 134 (FIGS. 3 and 4) which is selectively moved between an open position and a closed position by controlling pressurized gas supplied to the diaphragm assembly 130.

Referring to FIG. 1, although the diaphragm 134 (FIGS. 3 and 4) is pneumatically actuated, an electronically controlled valve 152, such as a solenoid valve, may be mounted to the diaphragm assembly 130 to selectively provide a pressurized gas from a pressurized gas supply 150, such as air or other gas, coupled to the electronically controlled valve 152 through a gas line 151. Programmable logic controllers (PLC) are coupled to the electronically controlled valves 152 to control electrical signals to the electronically controlled valve 152. The programmable logic controllers are in turn coupled to a main controller which controls the programmable logic controller. Although an electronically controlled valve provides pressurized gas to the diaphragm assembly 130, the valve assembly 100 is a pneumatically actuated valve since the diaphragm 134 (FIGS. 3 and 4) is actuated pneumatically.

Referring to FIGS. 2A, 2B, 3, and 4, in an open position, the diaphragm 134 (FIGS. 3 and 4) is away from the valve seat 120 (FIGS. 2A and 2B) to allow the in flow of a reactant from the reactant inlet 112 and the in flow of a purge gas from the purge inlet 114 through the valve chamber 111 to the outlet 116 and into the chamber body 20. In a closed position, the diaphragm 134 is in contact with the valve seat 120 to prevent in flow of a reactant from the reactant inlet 112 through the valve chamber 111.

In certain preferred embodiments, in a closed position, the diaphragm 134 does not block the in flow of the purge gas from the purge inlet 114 through the valve chamber 111 to the outlet 116 and into the chamber body 20. As shown in FIGS. 2A and 2B, the valve chamber 111 may further comprise a groove 122 formed in the valve body 110 below the valve seat 120 so that the purge inlet 114 and the outlet 116 remain in fluid communication whether the diaphragm 134 is in a closed position or open position. As shown, the groove 122 is annular in shape, but may be any suitable shape.

Still referring to FIGS. 2A and 2B, valve seat 120 may be an integral piece with the valve body 110. In an alternative embodiment, the valve seat 120 may be a separate piece from the valve body 110. The valve seat 120 is preferably made of a chemically resistant material which does not react with the reactant provided through the reactant inlet 112. Examples of chemically resistant material include polyimide (PI), polytetrafluoroethylene (PTFE), polychlorotriflouroethylene (PCTFE), perfluoroalkoxy (PFA), and other suitable polymers. In less preferred embodiments, the valve seat 120 may be made of metals, metal alloys, and other suitable materials. In certain embodiments, depending on the reactant provided therethrough, the valve body 110 is heated to a temperature between about 80° C. and about 90° C. to prevent condensation of the reactant on the diaphragm 134 or other valve assembly 100 components. If ammonia gas is used as a reactant, the valve seat 120 is preferably made of a chemically resistant polyimide, such as VESPEL® CR-6100. It has been shown that ammonia gas is chemically inert with the polyimide VESPEL® CR-6100 at temperatures of 80° C. or above while ammonia gas may react with other polyimides at temperatures of 80° C. or above.

The valve body 110 may further comprise one or more mounting holes 140 for mounting the valve assembly 100 to chamber components. The valve body 110 may further include a receptacle 118 around each of the reactant inlet 112, the purge inlet 114, and the outlet 116 for receiving an o-ring 119 to prevent leaks between the valve body 110 and chamber components. The receptacle 118 preferably has a round cross-section to better house an o-ring 119. The receptacle 118 may also be any other suitable shape. The o-rings 119 may be made of a polymer (i.e. synthetic or natural rubber), a metal, or metal alloy and is preferably made of an elastic polymer. In addition or alternatively, chamber components may include receptacles for receiving o-rings.

Figure 3:
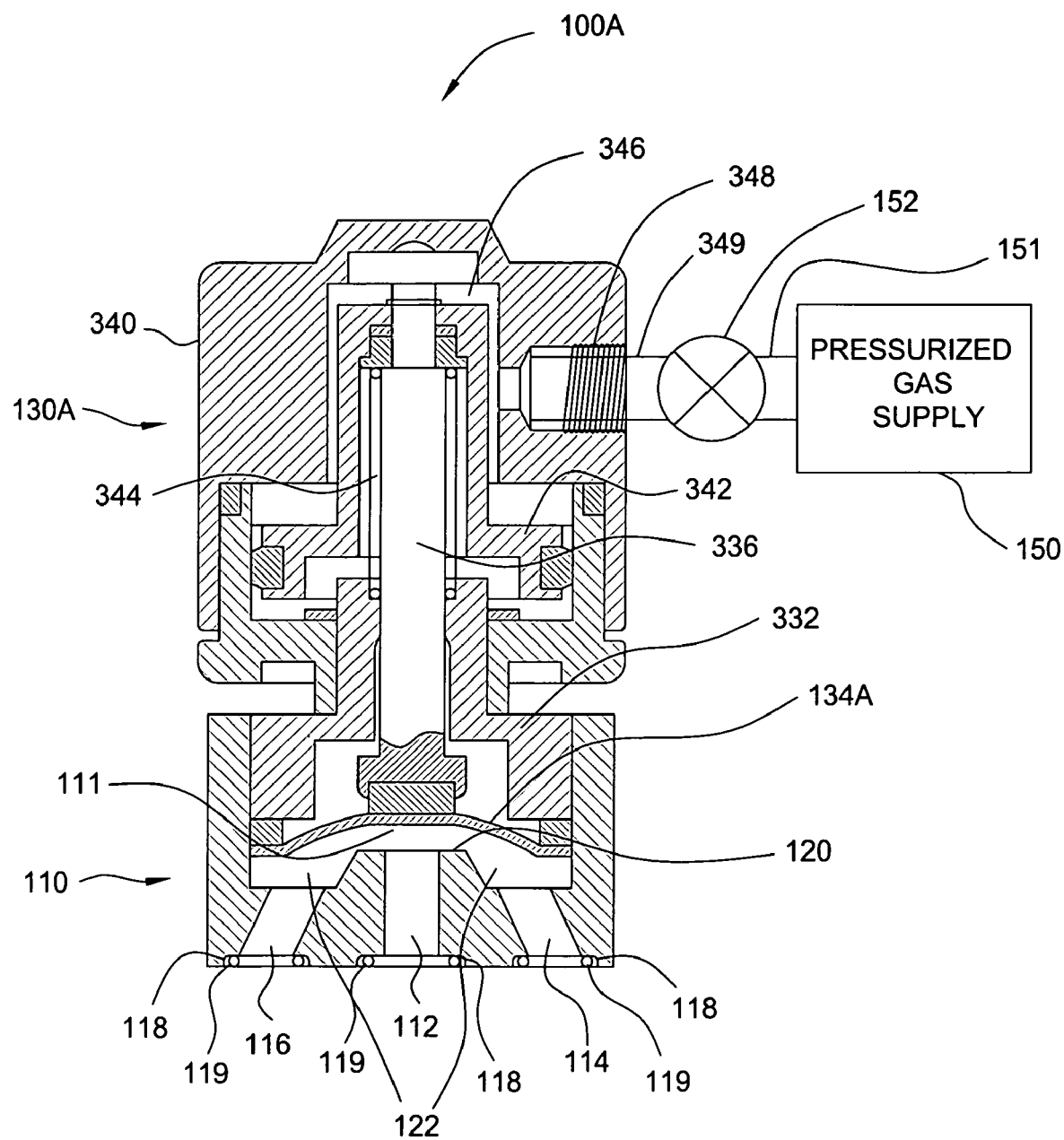
FIG. 3 is a schematic cross-sectional view of one embodiment of a valve assembly in which the diaphragm of the diaphragm assembly is biased in an open position.

FIG. 3 is a schematic cross-sectional view of one embodiment of a valve assembly 100A in which the diaphragm 134A of the diaphragm assembly 130A is biased in an open position. The diaphragm assembly 130 includes a bonnet 332 supporting the diaphragm 134A. The diaphragm 134A is attached to a stem 336 which extends through, and is slidably supported by the bonnet 332. The stem 336 selectively moves the diaphragm 134A between a closed position and an open position. A cylinder 340 is fixed to the top of the bonnet 332 and houses a piston 342. The top of the stem 336 protrudes from the bonnet 332 and is attached to a lower surface of the piston 342. A spring 344 rests between the bonnet 332 and the lower surface of the piston 342 and urges the piston 342 and the stem 336 upwardly. The cylinder 340 forms an actuation chamber 346 between an upper surface of the piston 342 and the inner surface of the cylinder 340. A conduit 348 is formed through the cylinder 340. The electronically controlled valve 152 is mounted to the cylinder 340 through a connector 349 disposed in the conduit 348 to provide a pressurized gas for controlling operation of the diaphragm 134A.

In operation, the electronically controlled valve 152 when open supplies pressurized gas through the connector 349 into the actuation chamber 346 creating a pressure that forces the piston 342 and the stem 336 downward against the elastic force of spring 344. The center portion of the diaphragm 134 is pressed downward by stem 336 and comes into contact with the valve seat 120 closing the inflow of reactant from the reactant inlet 112 to the outlet 116. When the diaphragm 134 is in contact with the valve seat 120, the diaphragm 134 does not block off the groove 122 and a purge gas may flow from the purge gas inlet 114 to the outlet 116. The electronically controlled valve 152, when closed, stops the supply of pressurized gas and releases the pressurized gas inside the actuation chamber 346. When the supply of pressurized gas is stopped and pressure inside the actuation chamber 346 is released, the piston 342 and the stem 336 are raised by the elastic force of the spring 344. As the piston 342 and the stem 336 rise, the diaphragm 134A moves away from the valve seat 120 of the valve body 110 allowing the inflow of reactant from the reactant inlet 112 to the outlet 116.

Figure 4:
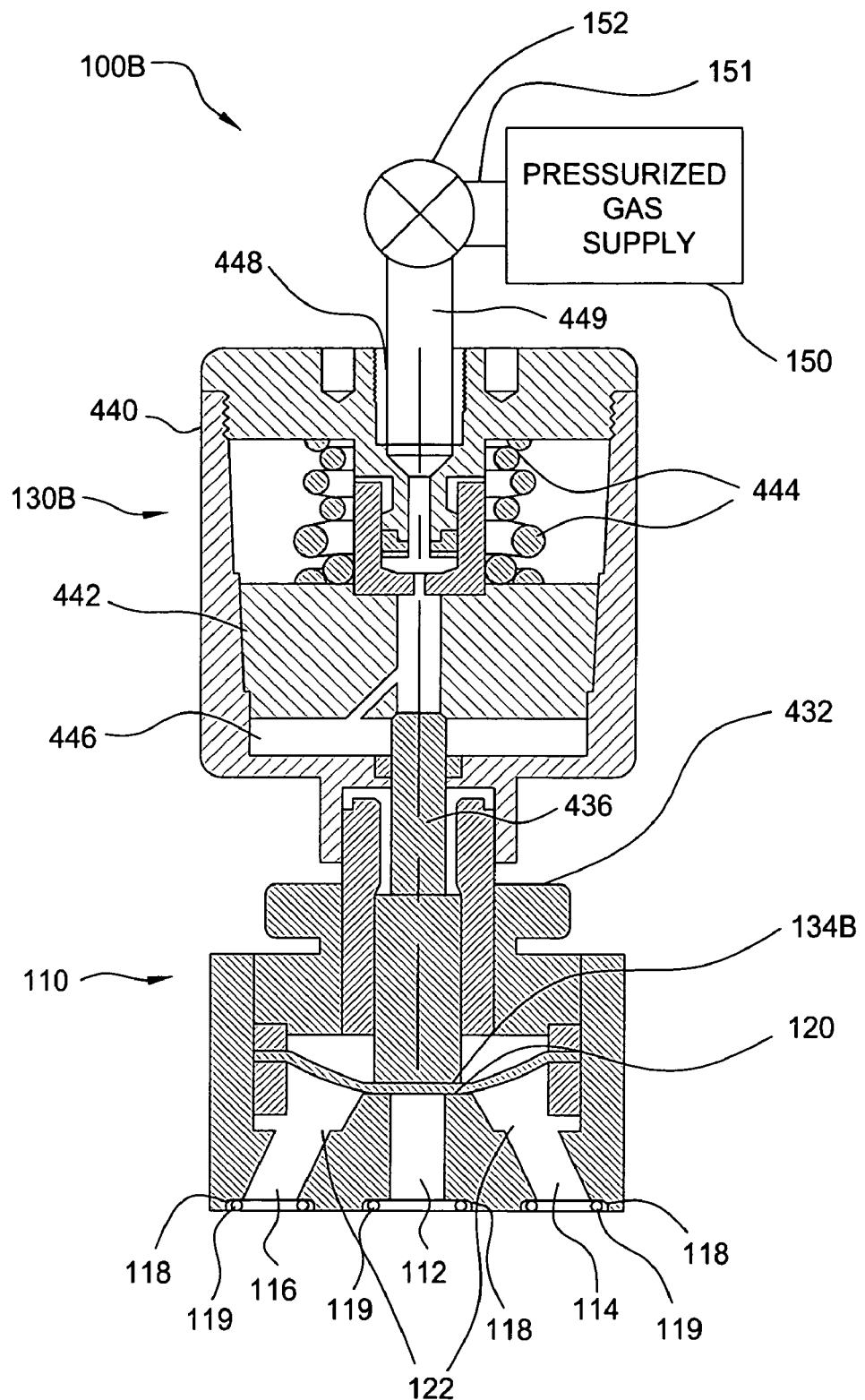
FIG. 4 is a schematic cross-sectional view of one embodiment of a valve assembly in which the diaphragm of the diaphragm assembly is biased in a close position.

FIG. 4 is a schematic cross-sectional view of one embodiment of a valve assembly 100B in which the diaphragm 134B of the diaphragm assembly 130B is biased in a closed position. The diaphragm assembly 130B includes a bonnet 432 supporting the diaphragm 134B. The diaphragm 134B is attached to a stem 436 which extends through, and is slidably supported by the bonnet 432. The stem 436 selectively moves the diaphragm 134B between a closed position and an open position. A cylinder 440 is fixed to the top of the bonnet 432. The top of the stem 436 protrudes from the bonnet 432 and is attached to a lower surface of a piston 442. A spring 444 rests between the upper surface of the piston 442 and the inner surface of the cylinder 440 and urges the piston 442 and the stem 436 downwardly. The cylinder 440 forms an actuation chamber 446 between a lower surface of the piston 442 and the inner surface of the cylinder 440. A conduit 448 is formed through the cylinder 440. The electronically controlled valve 152 is mounted to the cylinder 440 through a connector 449 disposed in the conduit 448 to provide a pressurized gas for controlling operation of the diaphragm 134B.

In operation, the electronically controlled valve 152, when open, supplies pressurized gas through the connector 449 into the actuation chamber 446 creating a pressure that forces the piston 442 and the stem 436 upward against the elastic force of spring 444. The center portion of the diaphragm 134B is pulled upward by stem 436 away from the valve seat 420 allowing inflow of reactant from the reactant inlet 112 to the outlet 116. The electronically controlled valve 152 when closed stops the supply of pressurized gas and releases the pressurized gas inside the actuation chamber 446. When the supply of pressurized gas is stopped and pressure inside the actuation chamber 446 is released, the piston 442 and the stem 432 are lowered by the elastic force of the spring 444 so that the diaphragm 134B comes into contact with the valve seat 120 closing the inflow of reactant from the reactant inlet 112 to the outlet 116. When the diaphragm 134B is in contact with the valve seat 120, the diaphragm 134B does not block off the groove 122 and the purge gas may flow from the purge gas inlet 114 to the outlet 116.

In reference to FIGS. 3 and 4, the diaphragm 134A, B may be moved between an open position and a closed position to provide pulses of a reactant to the outlet 116 and to the processing chamber 10. Since the diaphragm 134A, B in a closed position does not block off the groove 122 a continuous flow of purge gas may be provided from the purge inlet 114 through the valve chamber 111 and out to the outlet 116. As a consequence, the pulses of reactant may be dosed into the continuous flow of purge gas provided through the valve chamber 111. The continuous flow of purge gas provided through the valve chamber 111 flushes residual reactant remaining in the valve chamber 111 between pulses of reactants. In one aspect, the valve assembly 100 has a zero dead volume since there is negligible dead volume between the flow path of the purge gas through the valve body 110 to the valve seat 120 of the reactant inlet 112.

In one aspect, pneumatic control of the diaphragm 134 provides a "soft" landing of the diaphragm 134 against the valve seat 120 in comparison to diaphragms driven up and down by a solenoid. The "soft" landing reduces the formation of particles during movement of the diaphragm between an open position and a closed position caused by the impact of the diaphragm 134 against the valve seat 120. The "soft" landing also provides the reactant through the valve assembly 100 in more of a laminar flow in comparison to a "hard" landing caused by moving the diaphragm directly by a solenoid.

In certain embodiments, the internal volume of the actuation chamber 346, 446 comprises a small volume, preferably about 3.0 cm³ or less, more preferably about 1.0 cm³ or less. The term "internal volume of the actuation chamber" as used herein refers to the inner volume of the actuation chamber when the pressure inside the actuation chamber is released and includes the inner volume of the connector 349, 449 and any gas lines between the actuation chamber 346, 446 and the electrically controlled valve 152. A small internal volume of the actuation chamber 346, 446 can be pressurized more rapidly and as a consequence can actuate the diaphragm 134A, B more rapidly.

Figure 5:
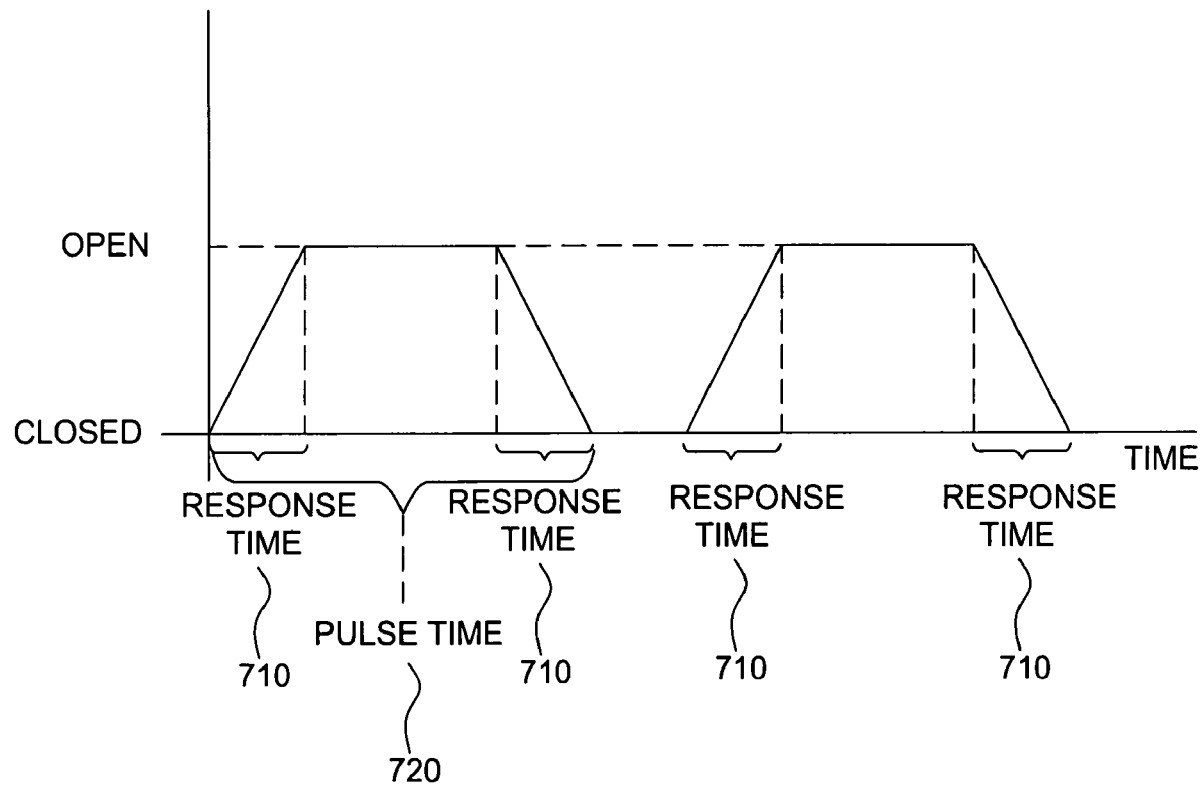
FIG. 5 is a graph of a response time of a diaphragm moved between a closed position and an open position.

FIG. 5 is a graph of the response time of the diaphragm 134 moved between a closed position and an open position. The term "response time" as used herein is defined as the time to move the diaphragm of the valve assembly from an open position to a closed position or from a closed position to an open position. The response time to move the diaphragm of the valve assembly from an open position to a closed position and the response time to move the diaphragm of the valve assembly from a closed position to an open position may be the same or may be different, but are preferably approximately the same. Preferably, the valve assembly 100 has a response time of about 50 milliseconds or less, more preferably 20 milliseconds or less. It has been observed that a valve assembly with an internal volume of the actuation chamber of about 2.8 cm³ has a response time of about 40 milliseconds or less. It has been observed that a valve with an internal volume of the actuation chamber of about 0.9 cm³ has a response time of about 15 milliseconds or less.

Reducing the response time of a valve assembly permits more cycles of pulses of reactants to be provided over time. Therefore, throughput of processing substrates is increased. However, the valve assembly can be operated to any desired pulse time 720. The term "pulse time" as used herein is defined as the time to move the diaphragm from a fully closed position to a fully open position and back to fully closed position. The valve assembly 100 may be operated to provide pulse times of about 1.0 second or less, about 500 milliseconds or less, and even about 200 milliseconds or less.

As shown in FIGS. 3 and 4, the electronically controlled valve 152 is mounted to the cylinder 340, 440 of the diaphragm assembly 130A, B to reduce the added volume of a gas line to the internal volume of the actuation chamber. An added volume of a gas line will increase the internal volume of the actuation chamber and will, thus, increase the time required to pressurize the actuation chamber 346, 446 and, thus, will increase the response time of the valve assembly 100. In alternative embodiments, if a gas line is used to couple the electronically controlled valve 152 to the cylinder 340, 440 of the diaphragm assembly 130A, B, the length of the gas line is preferably about 1.0 inch or less to reduce the internal volume of the actuation chamber.

Referring to FIG. 1, the gas line 151 connecting the pressurized gas supply 150 to the electronically controlled valve 152 preferably has an inner diameter of greater than about 0.125 inches, more preferably about 0.25 inches or more. The larger inner diameter of the gas line 151 facilitates the filling of the internal volume of the actuation chamber 346, 446 by providing a greater conductance of pressurized gas therethrough. As a consequence, a larger inner diameter of the gas line 151 supplying pressurized gas to the electronically controlled valve 152 reduces the response time of the valve assembly 100.

Figure 6:
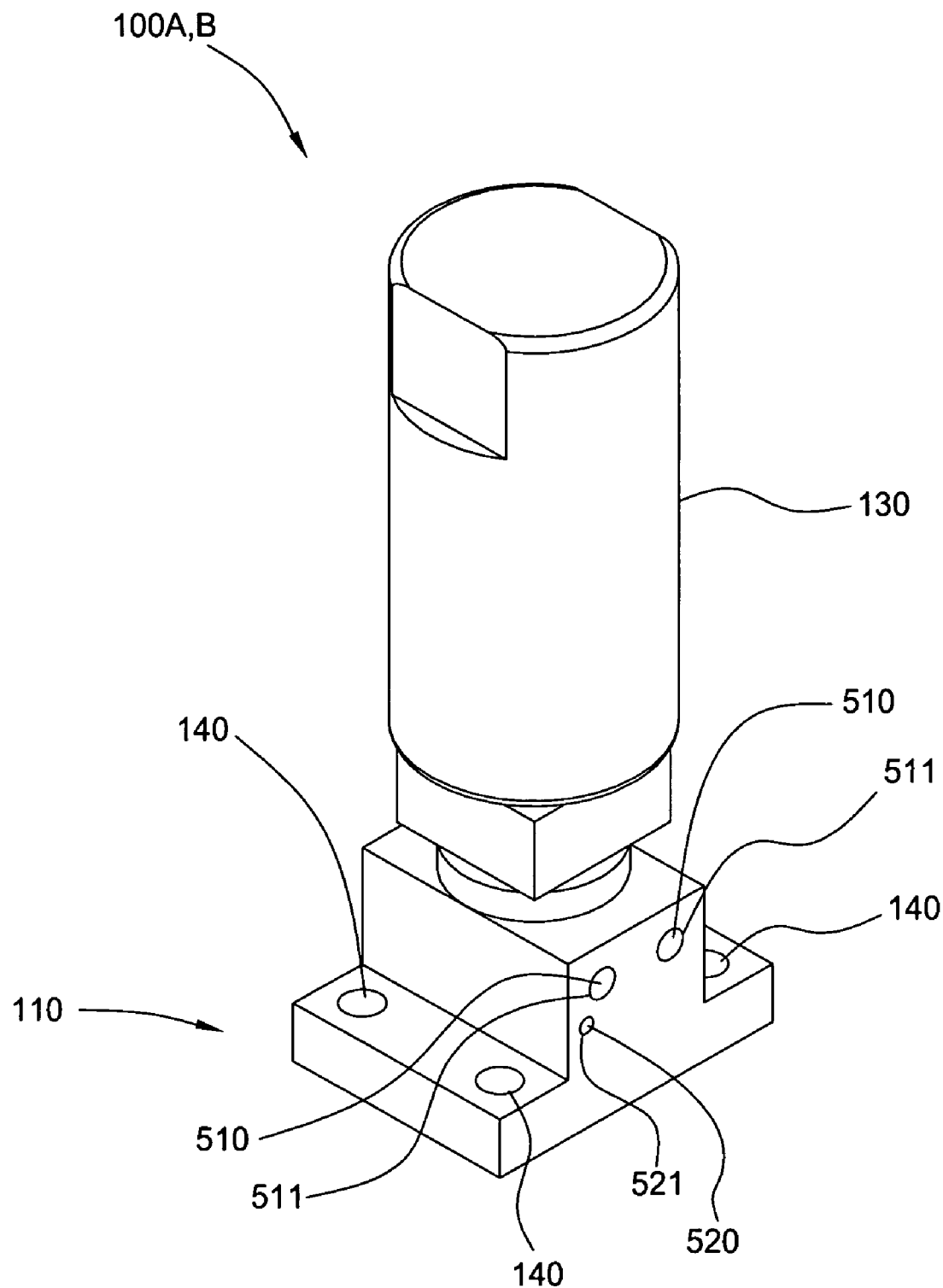
FIG. 6 is a schematic perspective view of one embodiment of a valve assembly.

FIG. 6 is a schematic perspective view of the valve assembly 100 A, B as described in reference to FIGS. 3 and 4. The valve body 110 may include one or more holes 510 for insertion of an embedded heating element 511. Preferably, the holes 510 are proximate to the reactant inlet 112 so that the reactant is heated to prevent condensation of the reactant on the diaphragm 134. The valve body 110 may include one or more holes 520 for insertion of a thermocouple device 521 to monitor the temperature of the valve body 110. For example, a measured temperature may be used in a feedback loop to control electric current applied to the heating element 511 from a power supply, such that the valve body temperature can be maintained or controlled at a desired temperature or within a desired temperature range. In reference to FIGS. 2A and 2B, the position of the one or more holes 510 for insertion of an embedded heating element and the position of the one or more holes 520 for the insertion of a thermocouple device are shown by hidden lines. The holes 510 and 520 may be positioned in close proximity, preferably at a distance of about 2.0 mm or less, to the reactant inlet 112 to better provide heating of the reactant inlet and to better monitor the temperature of the reactant inlet 112. Preferably, as shown in FIGS. 2A–2B, each hole 510 for an embedded heating element is disposed in a direction parallel to the plane of the inlets 112, 114 and outlet 116 so that the embedded heating element may also provide a more uniform heating of inlets 112, 114 and the outlet 116.

In one embodiment, the valve assembly 100 may be used with a chamber lid, such as the chamber lid 32 as described in reference to FIG. 1. The chamber lid 32 includes an expanding channel 34 extending from a central portion of the chamber lid 32 and a bottom surface 60 extending from the expanding channel 34 to a peripheral portion of the chamber lid 32. The bottom surface 60 is sized and shaped to substantially cover a substrate disposed on the substrate support. The gas conduit 50 provides a gas flow from the valve assembly 100 to the expanding channel 34. The gas conduit 50 is located adjacent the upper portion 37 of the expanding channel 34. In other embodiments, one or more gas conduits may be located along the length of the expanding channel 34 between the upper portion 37 and a lower portion 35. As shown in the figure, the gas conduit 50 is positioned horizontally normal to the longitudinal axis. In other embodiments, the gas conduit 50 may be angled downwardly or may be angled upwardly.

The expanding channel 34 comprises a channel which has an inner diameter which increases from an upper portion 37 to the lower portion 35 of the expanding channel 34 adjacent the bottom surface 60 of the chamber lid 32. Whether a gas is provided toward the walls of the expanding channel 34 or directly downward towards the substrate, the velocity of the gas flow decreases as the gas flow travels through the expanding channel 34 due to the expansion of the gas. The reduction of the velocity of the gas flow helps reduce the likelihood the gas flow will blow off reactants adsorbed on the surface of the substrate.

At least a portion of the bottom surface 60 of the chamber lid 32 may be tapered from the expanding channel 34 to a peripheral portion of the chamber lid 32 to help provide an improved velocity profile of a gas flow from the expanding channel 34 across the surface of the substrate (i.e., from the center of the substrate to the edge of the substrate). In one embodiment, the bottom surface 60 is tapered in the shape of a funnel. Not wishing to be bound by theory, in one aspect, the bottom surface 60 is downwardly sloping to help reduce the variation in the velocity of the gases as it travels between the bottom surface 60 of the chamber lid 32 and the substrate to help provide uniform exposure of the surface of the substrate to a reactant.

Figure 7:
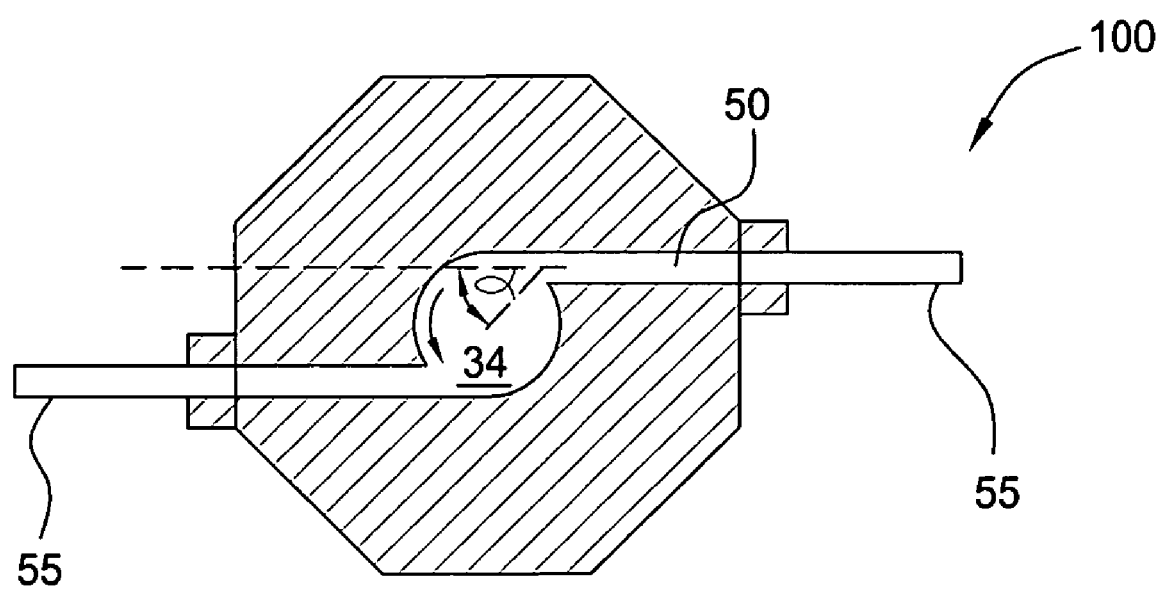
FIG. 7 is a top cross-sectional view of one embodiment of the chamber lid of FIG. 1.

FIG. 7 is a top cross-sectional view of one embodiment of the expanding channel of the chamber lid 32 of FIG. 1. Each gas conduit 50 may be positioned at an angle α from a center line of the gas conduit 50 and from a radius line from the center of the expanding channel 34. Entry of a gas through the gas conduit 50 preferably positioned at an angle α (i.e., when α>0°) causes the gas to flow in a circular direction. Providing gas at an angle α as opposed to directly straight-on to the walls of the expanding channel (i.e., when α=0°) helps to provide a more laminar flow through the expanding channel 34 rather than a turbulent flow.

The chamber lid 32 is further described in commonly assigned U.S. Ser. No. 10/032,284, entitled "Gas Delivery Apparatus and Method for Atomic Layer Deposition," filed on Dec. 21, 2001, and issued Sep. 13, 1988 as U.S. Pat. No. 6,916,398, which claims benefit of U.S. Ser. No. 60/346,086, entitled "Method and Apparatus for ALD Deposition," filed Oct. 26, 2001, which are both incorporated by reference in their entirety to the extent not inconsistent with the present disclosure.

The valve assembly 100 may be used with other chamber lids. For example, the valve assembly 100 may be used with the chamber lid described in commonly assigned U.S. Ser. No. 10/032,293 entitled, "Chamber Hardware Design For Titanium Nitride Atomic Layer Deposition," filed on Dec. 21, 2001, and published as US 2003-0116087, which is incorporated by reference in its entirety to the extent not inconsistent with the present disclosure. The valve assembly 100 may also be used with the chamber lid as described in U.S. Ser. No. 10/016,300, entitled "Lid Assembly For A Processing System To Facilitate Sequential Deposition Techniques," filed on Dec. 12, 2001, and issued on Apr. 12, 2005 as U.S. Pat. No. 6,878,206, which claims priority to U.S. Ser. No. 60/305,970, filed on Jul. 16, 2001, which are both incorporated by reference in their entirety to the extent not inconsistent with the present disclosure. The valve assembly 100 may also be used with the chamber lid as described in commonly assigned U.S. Pat. No. 6,911,391, issued Jun. 28, 2005, which claims priority to U.S. Ser. No. 60/352,191, which are both incorporated by reference in their entirety to the extent not inconsistent with the present disclosure.

The valve assembly 100 as shown and described in reference to FIGS. 1–7 may be adapted to perform deposition processes including atomic layer deposition, cyclical layer deposition, pulsed chemical vapor deposition, and other suitable deposition techniques. The term "cyclical layer deposition" as used herein refers to the sequential introduction of pulses of one or more compounds to deposit a thin layer of material on a substrate. Sequentially providing pulses of compounds may result in the formation of thin layers of material over a substrate structure. Each thin layer of material may be less than a monolayer, a monolayer, or more than a monolayer of material. The sequential introduction of pulses of compounds may be repeated to deposit a plurality of thin layers forming a conformal layer to a desired thickness.

The valve assembly 100 may be used to form tantalum nitride, tantalum, tantalum silicon nitride, copper, copper aluminum, titanium nitride, titanium, titanium silicon nitride, tungsten nitride, tungsten, tungsten silicon nitride, metal oxides, organosilanes or organosiloxanes, other refractory metals, other refractory metal nitrides, other refractory metal compounds, other metals, other metal alloys, other high dielectric constant materials, and other low dielectric constant materials.

For example, a substrate processing chamber, such as chamber 10 of FIG. 1, can be used to deposit tantalum nitride. The chamber includes at least two valve assemblies 100. One valve assembly 100 is coupled to a reactant source providing a tantalum containing compound, such as pentadimethylamino-tantalum (PDMAT; $Ta(NMe_2)_5$), source and one valve assembly 100 is coupled to another reactant source providing a nitrogen containing compound, such as ammonia. Separate purge gas sources may be coupled to both valve assemblies 100 to provide a continuous flow of a purge gas thereto. Examples of purge gas include argon (Ar), helium (He), nitrogen ($N_2$), hydrogen ($H_2$), and combinations thereof. Although separate purge gas sources may be coupled to both valve assemblies 100, the separate purge gas sources may provide the same or different purge gas. Pulses of the tantalum containing compound and pulses of the nitrogen containing compound may be dosed into the continuous flow of the purge gas. The pulses of the tantalum containing compound and the pulses of the nitrogen containing compound may be present in the reaction zone separately, together, or partially overlapped to form a tantalum nitride film.

While the foregoing is directed to embodiments of the present invention, other and further embodiments of the invention may be devised without departing from the basic scope thereof, and the scope thereof is determined by the claims that follow.

The invention claimed is:

1. A substrate processing chamber, comprising:
   a chamber body containing a substrate support;
   a lid assembly comprising an expanding channel extending from a central portion of the lid assembly to a peripheral portion of the lid assembly and positioned to substantially cover the substrate support; and
   one or more valves adapted to provide one or more reactants into the chamber body, each valve comprising:
      a valve body having at least two ports comprising a purge inlet and an outlet;
      a valve seat surrounding one of the ports;
      an annular groove formed around the valve seat coupling the purge inlet and the outlet; and
      a diaphragm assembly, comprising:
         a diaphragm movable to contact the valve seat;
         a piston coupled to the diaphragm; and
         a cylinder to house the piston.

2. The substrate processing chamber of claim 1, wherein the cylinder forms an actuation chamber having an internal volume of about 3.0 $cm^3$ or less.

3. The substrate processing chamber of claim 2, wherein the internal volume is about 1.0 $cm^3$ or less.

4. The substrate processing chamber of claim 2, further comprising an electronically controlled valve adapted to provide pressurized gas to the actuation chamber from a pressurized gas supply.

5. The substrate processing chamber of claim 4, further comprising a gas line coupling the pressurized gas supply and the electronically controlled valve, wherein the gas lines having a diameter of greater than about 0.32 cm.

6. The substrate processing chamber of claim 5, wherein the diameter is about 0.64 cm or more.

7. The substrate processing chamber of claim 5, wherein the diaphragm in a closed position closes the reactant inlet, while the purge inlet and the outlet remain opened.

8. The substrate processing chamber of claim 4, wherein the electronically controlled valve is coupled to the cylinder through a gas line having a length of about 2.54 cm or less.

9. The substrate processing chamber of claim 8, further comprising an embedded heating element within the valve body.

10. The substrate processing chamber of claim 1, wherein the one or more valves are coupled to separate purge gas supplies.

11. The substrate processing chamber of claim 1, further comprising a controller adapted to move the diaphragm between an open position and a closed position within a time period of about 1 second or less.

12. The substrate processing chamber of claim 11, wherein the time period is about 500 milliseconds or less.

13. The substrate processing chamber of claim 12, wherein the at least two ports of the valve body comprise a reactant inlet, a purge inlet, and an outlet.

14. The substrate processing chamber of claim 12, wherein the time period is about 200 milliseconds or less.

15. The substrate processing chamber of claim 14, wherein the time period is about 50 milliseconds or less.

16. The substrate processing chamber of claim 13, wherein the time period is about 20 milliseconds or less.

17. The substrate processing chamber of claim 1, further comprising an embedded heating element within the valve body.

18. The substrate processing chamber of claim 17, further comprising an embedded thermocouple within the valve body.

19. The substrate processing chamber of claim 1, further comprising an embedded heating element, an embedded thermocouple, or a combination thereof within the valve body.

20. A substrate processing chamber, comprising:
a chamber body containing a substrate support;
a lid assembly comprising an expanding channel extending from a central portion of the lid assembly to a peripheral portion of the lid assembly and positioned to substantially cover the substrate support; and
one or more valves adapted to provide one or more reactants into the chamber body, each valve comprising:
a valve body having at least three ports comprising a purge inlet, an outlet, and a reactant inlet;
a valve seat surrounding one of the ports;
an annular groove formed around the valve seat coupling the purge inlet and the outlet; and
a diaphragm assembly.

21. The substrate processing chamber of claim 20, wherein the diaphragm assembly further comprises:
a diaphragm movable to contact the valve seat;
a piston coupled to the diaphragm; and
a cylinder to house the piston.

22. The substrate processing chamber of claim 21, wherein the cylinder forms an actuation chamber having an internal volume of about 3.0 cm³ or less.

23. The substrate processing chamber of claim 22, wherein the internal volume is about 1.0 cm³ or less.

24. The substrate processing chamber of claim 22, further comprising an electronically controlled valve adapted to provide pressurized gas to the actuation chamber from a pressurized gas supply.

25. The substrate processing chamber of claim 24, further comprising a gas line coupling the pressurized gas supply and the electronically controlled valve, wherein the gas lines having a diameter of greater than about 0.32 cm.

26. The substrate processing chamber of claim 25, wherein the diameter is about 0.64 cm or more.

27. The substrate processing chamber of claim 21, wherein the diaphragm in a closed position closes the reactant inlet, while the purge inlet and the outlet remain opened.

28. The substrate processing chamber of claim 21, further comprising a controller adapted to move the diaphragm between an open position and a closed position within a time period of about 1 second or less.

29. The substrate processing chamber of claim 28, wherein the time period is about 200 milliseconds or less.

30. The substrate processing chamber of claim 29, wherein the time period is about 20 milliseconds or less.

31. The substrate processing chamber of claim 20, wherein the one or more valves are coupled to separate purge gas supplies.

32. The substrate processing chamber of claim 20, wherein the electronically controlled valve is coupled to the cylinder through a gas line having a length of about 2.54 cm or less.

33. A substrate processing chamber, comprising:
a chamber body containing a substrate support;
a lid assembly comprising an expanding channel extending from a central portion of the lid assembly to a peripheral portion of the lid assembly and positioned to substantially cover the substrate support; and
one or more valves adapted to provide one or more reactants into the chamber body, each valve comprising:
a valve body having at least three ports comprising a purge inlet, an outlet, and a reactant inlet;
a valve seat surrounding the purge inlet, the outlet, or the reactant inlet;
an annular groove formed around the valve seat coupling the purge inlet and the outlet, and wherein the purge inlet, the outlet, and the reactant inlet each contain an o-ring; and
a diaphragm assembly, comprising:
a diaphragm movable to contact the valve seat;
a piston coupled to the diaphragm; and
a cylinder to house the piston.

34. The substrate processing chamber of claim 33, wherein the cylinder forms an actuation chamber having an internal volume of about 3.0 cm³ or less.

35. The substrate processing chamber of claim 34, wherein the internal volume is about 1.0 cm³ or less.

36. The substrate processing chamber of claim 34, further comprising an electronically controlled valve adapted to provide pressurized gas to the actuation chamber from a pressurized gas supply.

37. The substrate processing chamber of claim 36, further comprising a gas line coupling the pressurized gas supply and the electronically controlled valve, wherein the gas lines having a diameter of greater than about 0.32 cm.

38. The substrate processing chamber of claim 37, wherein the diameter is about 0.64 cm or more.

39. The substrate processing chamber of claim 36, wherein the electronically controlled valve is coupled to the cylinder through a gas line having a length of about 2.54 cm or less.

40. The substrate processing chamber of claim 33, wherein the diaphragm in a closed position closes the reactant inlet, while the purge inlet and the outlet remain opened.

41. The substrate processing chamber of claim 33, wherein the one or more valves are coupled to separate purge gas supplies.

42. The substrate processing chamber of claim 33, further comprising a controller adapted to move the diaphragm between an open position and a closed position within a time period of about 1 second or less.

43. The substrate processing chamber of claim 33, wherein the time period is about 200 milliseconds or less.

44. The substrate processing chamber of claim 33, wherein the time period is about 20 milliseconds or less.

45. The substrate processing chamber of claim 33, further comprising an embedded heating element, an embedded thermocouple, or a combination thereof within the valve body.

* * * * *